(12) United States Patent
Duff

(10) Patent No.: US 7,714,719 B2
(45) Date of Patent: May 11, 2010

(54) FIELD DISTURBANCE SENSOR UTILIZING LEAKY OR RADIATING COAXIAL CABLE FOR A CONFORMABLE ANTENNA PATTERN

(75) Inventor: David Delos Duff, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 11/477,104

(22) Filed: Jun. 27, 2006

(65) Prior Publication Data

US 2007/0296578 A1    Dec. 27, 2007

(51) Int. Cl.
*G08B 13/00* (2006.01)
(52) U.S. Cl. .................. 340/567; 340/431; 340/436; 340/552; 340/541; 340/426.1; 343/790; 343/770
(58) Field of Classification Search .......... 340/567, 340/431, 539.26, 539.25, 541, 545.2, 545.3, 340/554, 436, 552, 426.1; 348/143; 343/790, 343/770
See application file for complete search history.

(56) References Cited

U.S. PATENT DOCUMENTS

| | | | | |
|---|---|---|---|---|
| 3,729,740 | A * | 4/1973 | Nakahara et al. ............ | 343/713 |
| 4,536,752 | A * | 8/1985 | Cheal et al. ................. | 340/554 |
| 4,673,935 | A | 6/1987 | Spencer | |
| 4,750,197 | A * | 6/1988 | Denekamp et al. ........ | 455/404.2 |
| 4,879,544 | A * | 11/1989 | Maki et al. .................. | 340/552 |
| 5,473,336 | A * | 12/1995 | Harman et al. .............. | 343/790 |
| 5,939,982 | A * | 8/1999 | Gagnon et al. ......... | 340/539.17 |
| 6,091,372 | A * | 7/2000 | Dienes ........................ | 343/770 |
| 6,129,025 | A * | 10/2000 | Minakami et al. ......... | 104/88.01 |
| 6,919,803 | B2 | 7/2005 | Breed | |
| 7,019,648 | B2 * | 3/2006 | Gagnon ...................... | 340/552 |
| 7,098,444 | B2 | 8/2006 | Beinhocker | |

(Continued)

FOREIGN PATENT DOCUMENTS

EP            0361877            4/1990

(Continued)

OTHER PUBLICATIONS

International Search Report, PCT/US07/071745—International Search Authority—European Patent Office—Nov. 28, 2007.

(Continued)

*Primary Examiner*—Davetta W Goins
*Assistant Examiner*—Hoi C Lau
(74) *Attorney, Agent, or Firm*—Ashish L. Patel

(57) ABSTRACT

A system, device, and method for monitoring an uncontrolled area around a mobile object uses a distributed antenna, which can be a leaky coaxial cable, enclosing its perimeter. A field disturbance sensor, such as a microwave sensor, detects an intruder entering a protected area defined by field of the antenna. An alarm signal is sent to a wireless transceiver for transmission of an alarm event to a remote station. A biometric sensor, such as a passive infrared heat detector, can be used in conjunction with the field disturbance sensor to reduce possible false alarms. Identification of a legitimate alarm may alternatively be verified with video images obtained near an area of interest in proximity to the mobile object, which may be forwarded by the wireless transceiver to a remote station for analysis.

25 Claims, 3 Drawing Sheets

U.S. PATENT DOCUMENTS

| | | | |
|---|---|---|---|
| 7,126,476 B2 * | 10/2006 | Alkelai et al. | 340/565 |
| 2003/0227382 A1 * | 12/2003 | Breed | 340/539.13 |
| 2004/0178880 A1 * | 9/2004 | Meyer et al. | 340/5.22 |
| 2004/0210350 A1 * | 10/2004 | Rao et al. | 701/1 |
| 2005/0024210 A1 * | 2/2005 | Maki | 340/566 |
| 2007/0008410 A1 * | 1/2007 | Benson et al. | 348/143 |
| 2007/0067081 A1 * | 3/2007 | Ton | 701/41 |
| 2008/0036597 A1 * | 2/2008 | Harman | 340/552 |

FOREIGN PATENT DOCUMENTS

| | | |
|---|---|---|
| WO | 9639640 | 12/1996 |
| WO | 2005013223 | 2/2005 |

OTHER PUBLICATIONS

Written Opinion—PCT/US07/071745, International Searching Authority—European Patent Office, Nov. 28, 2007.

* cited by examiner

FIELD DISTURBANCE SENSOR UTILIZING LEAKY OR RADIATING COAXIAL CABLE FOR A CONFORMABLE ANTENNA PATTERN

BACKGROUND

Protecting cargo in an uncontrolled environment (e.g. out of doors on the city streets, at a rest stop, etc.) is problematic. Providing security coverage for a long, rectangular area can be particularly difficult in instances wherein monitoring employs the use of circular patterns as is the case with a transmitter of electromagnetic radiation from a point source. Similarities exist in this instance and with the case of providing lighting on a winding street in a city neighborhood. Light may be desired for the street but not necessarily for areas located along the street such as houses and yards. Use of a circular light pattern to illuminate a street would likely result in illumination of unwanted areas as well. Moreover, the circular light pattern would more likely result in unlit spots on the street together with lighted areas adjacent the street.

Security coverage furnished by radiating an invisible electromagnetic point source encounters a similar problem, whether that source be a microwave emission from a field disturbance sensor (FDS) or otherwise. Just as it would be desirous to provide lighting for a street with a lighting pattern that is only as wide and as long as the street itself, a need exists to be able to provide security coverage through the use of electromagnetic monitoring that protects a coverage area outlining an odd or oblong shape such as that of a commercial truck and/or trailer. Conventional field disturbance sensors for electromagnetic field disturbance intruder detection generally employ a patch antenna that creates a spherical shaped coverage area. In order to sufficiently protect a tractor trailer with a FDS that emits a circular, mushroom shaped field, it would be necessary to install two, three, four or more additional field disturbance sensors in order to cover field gaps created by metal objects such as wheels, an engine, a transmission, a chassis, etc. A need exists to provide security protection for a large object such as a truck and trailer. Further, a need exists to provide security protection for a large object such as a trailer wherein advance warning, such as a proximity alert, is generated in response to someone entering a protected area around that object.

Figure 1:
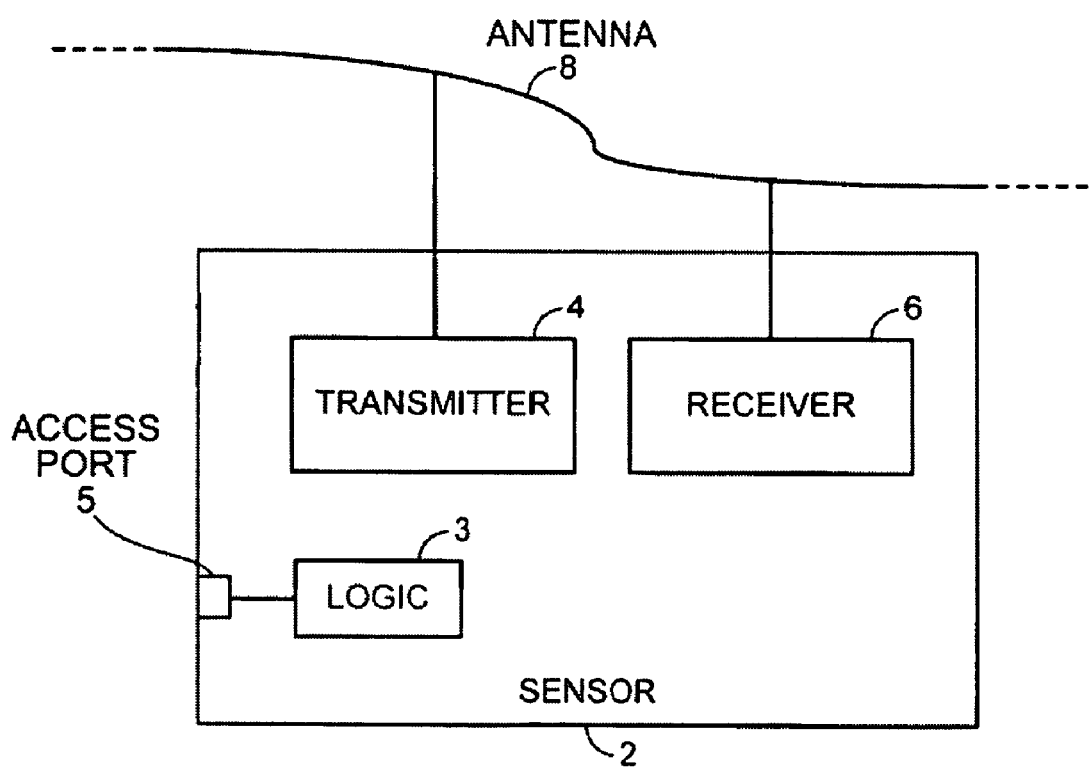
FIG. 1 is a diagram showing a microwave sensor including a transmitter and a receiver.

Applicable reference numerals have been carried forward.

DETAILED DESCRIPTION

FIG. 1 illustrates a diagram showing microwave sensor 2 including transmitter 4 and receiver 6. Microwave sensor 2 may function as a field disturbance sensor (FDS). In one embodiment, antenna 8 is connected to both transmitter 4 and receiver 6. A signal of frequency ft emanates from transmitter 4 through antenna 8 which in one aspect of a preferred embodiment is a distributed antenna. Sensor 2 includes logic 3 operable to coordinate sending signals and conduct the activities of sensor 2 in conjunction with other sensors. Logic 3 is connected to access port 5 in sensor 2. Logic 3, in another embodiment, can be provided outside of, rather than within sensor 2. Antenna 8 is a coaxial cable that can be characterized as leaky, such as model RXL1-1A cable sold by Andrews Corporation. Microwave sensor 2 may be adapted from a FDS like the Directed Electronics Inc. (DEI) Model 508D Invisibeam, which is sold as an accessory for Clifford and Viper car alarms.

Figure 2:
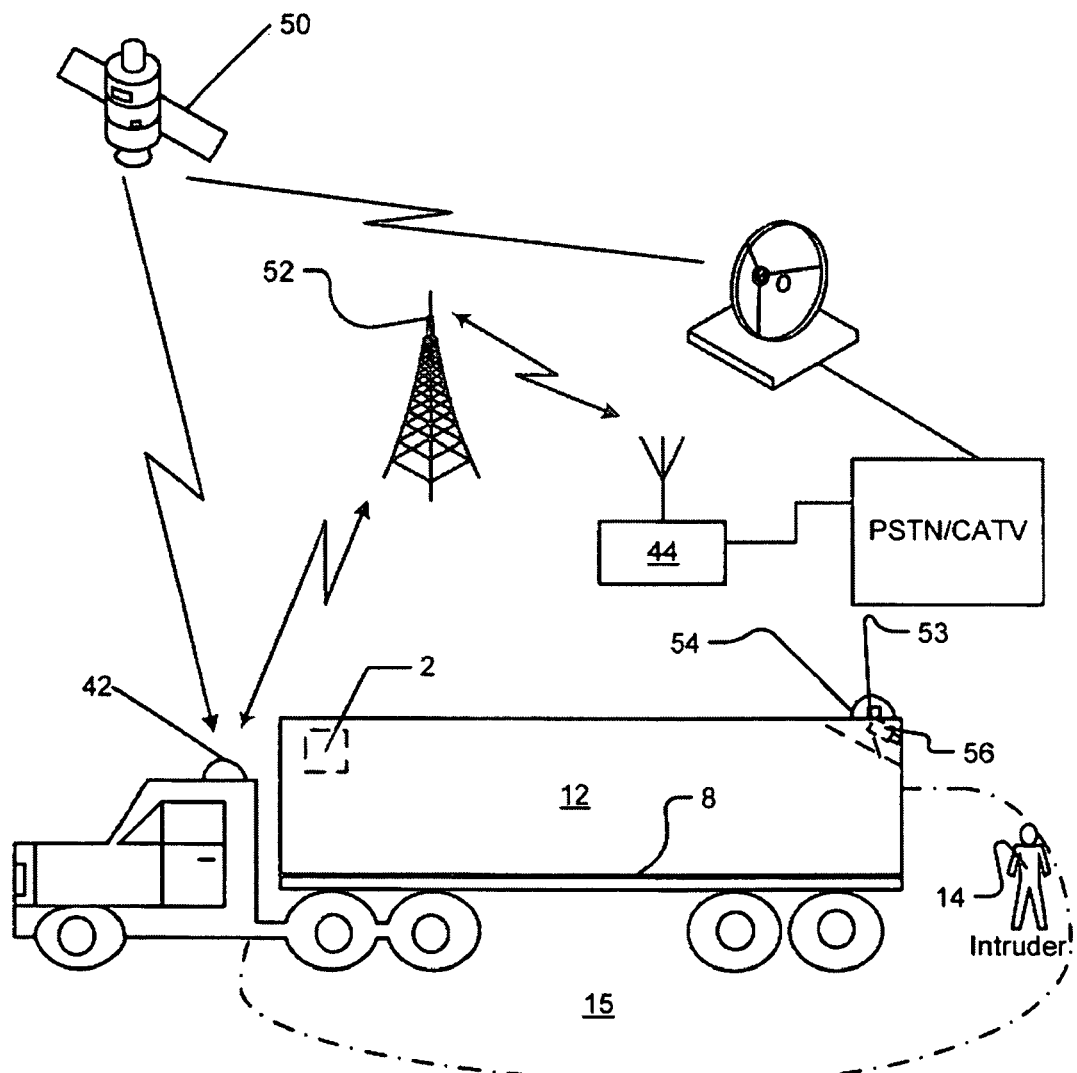
FIG. 2 is a diagram showing communicating elements including an antenna, which in a preferred embodiment, circumscribes the perimeter of a guarded object such as a trailer or other object for which security is desired.
Figure 3:
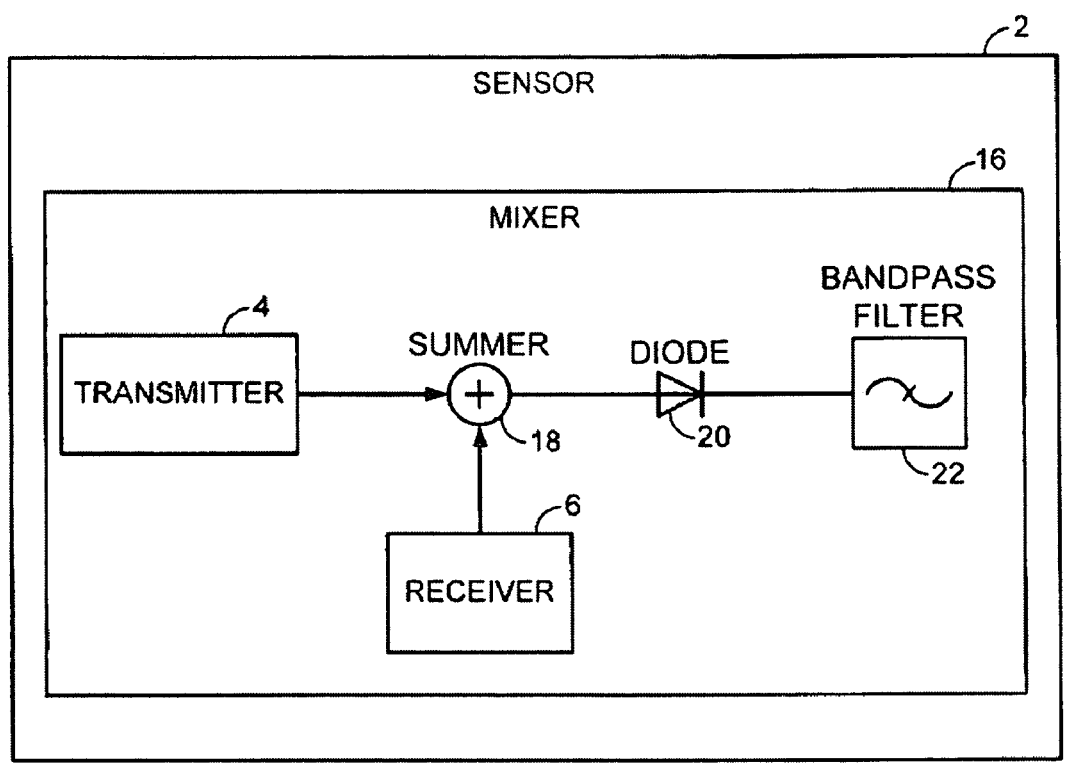
FIG. 3 is a schematic/block diagram showing a mixer within a microwave sensor.

FIG. 2 illustrates a diagram showing communicating elements including antenna 8, which, in a preferred embodiment, circumscribes the perimeter of a guarded object such as trailer 12 or other object for which security is desired. The leaky coax provided by antenna 8 can ideally be wrapped around any odd shaped object such as a tractor trailer to provide a comfortable coverage area 15 for security monitoring. In one aspect of a preferred embodiment, microwave sensor 2 is located within trailer 12. Microwave sensor 2 operates in accordance with the well-known Doppler Effect. The Doppler Effect arises when either the source of an oscillating signal or the receiver of an oscillating signal is in motion, producing a resulting signal with a frequency shift. This frequency shifted signal is referred to as the Doppler frequency. Should intruder 14 move in a forbidden area near a protected perimeter, a portion of the signal of frequency ft incident to intruder 14 is reflected by intruder 14 and received by receiver 6 of FIG. 1 as a reflected signal of frequency fr incident to antenna 8. Mixer 16 within sensor 2 is shown in the schematic/block diagram of FIG. 3. Mixer 16, which in the embodiment is shown in FIG. 3, is an additive mixer, includes summer 18 which receives an input from transmitter 4 and receiver 6. The summed output from summer 18 is passed through a device with a nonlinear transfer function such as diode 20 which has a square law response that in certain conditions can provide an almost linear relationship between the signal of frequency ft and signal of frequency fr. The output of diode 20 contains many signal components including signals of frequencies equal to the sum and difference of ft and fr and several harmonics. Diode 20's output is passed to bandpass filter 22. Bandpass filter 22 may be setup wide enough to just pass a range of signals with frequencies between the difference of ft and fr. The Doppler frequency, fd is determined by the difference of ft and fr. Doppler frequency fd can also be evaluated by the following formula:

fd=2vr ft/c, where c is the speed of light ($3 \times 10^8$ m/s) and vr is the radial speed of intruder 14 with respect receiver 6.

Detection of an intruder may be based on registration of a frequency fr different from ft or at a frequency of some value in excess of or below ft. Further, detection of an intruder may be based on calculation of a Doppler frequency other than zero or within a predetermined range.

With reference to FIG. 1, in an alternative embodiment, microwave sensor 2 can employ a frequency-modulated continuous wave (FMCW). In this embodiment, a frequency-modulated transmitted signal emanates from transmitter 4 as produced by a modulation generator (not shown). The modulation can occur sinusoidally, linearly or pursuant to a time function. A signal transmitted with a frequency of ft0(t) is reflected by intruder 14 moving within the perimeter of monitored area 15 around trailer 12.

After a time, Δt, receiver 6 receives part of the reflected signal from intruder 14. By then, transmitter 4 is emanating a signal of frequency ft0(t+Δt). In an alternative embodiment, mixer 16 mixes the reflected signal of frequency ft0(t) with the transmitted signal of frequency ft0(t+Δt) to obtain an intermediate frequency of fif, analogous fd above, pursuant to one of the mixed products from mixer 16. The radial speed of intruder 14 can therefore be determined.

With reference to FIG. 2, in connection with detection of an intruder in any of the embodiments as discussed above or should the radial speed of a detected intruder be within a specified threshold, microwave sensor 2, in conjunction with logic 3 therein, sends an alarm signal to a wireless transceiver, known as Mobile Communications Terminal (MCT) 42, for communicating with remote station 44. Microwave sensor 2 can be connected to MCT 42 through a well-known 7 pin connector (not shown) of trailer 12. Alternatively, sensor 2 can communicate wirelessly with MCT 42. In one embodiment, MCT 42 comprises an OmniTRACS® satellite transceiver manufactured by Qualcomm Incorporated of San Diego, Calif., for communicating wirelessly with satellite 50. However, MCT 42 may alternatively comprise a digital or analog cellular transceiver. In other embodiments, MCT 42 is coupled to a variety of sensors throughout trailer 12 to monitor the various vehicle functions, including those related to security. In another embodiment, MCT 42 resides entirely onboard trailer 12. In other embodiments, MCT 42 uses a terrestrial wireless communication system to communicate with remote station 44, such as an analog or digital cellular telephone system (through base transceiver station (BTS) 52), or a wireless data communications network (such as a digital packet data (CDPD) network). Further security procedures may be carried out at remote station 44 in response to an alarm signal. Toward this effort, communication using the Public Switched Telephone Network (PSTN) or a cable television network (CATV) can be carried out through further communication with satellite 50 using satellite dish 60. These security procedures can range from alerting authorities to initiating additional procedures to verify the alarm status.

One consequence of security monitoring in an uncontrolled environment is that a high false alarm rate may result from moving objects, other than intruders, being detected by a microwave sensor. In another preferred embodiment, one or more biometric or other sensors are used in combination with microwave sensor 2 of FIGS. 1 and 2 in an effort to verify movement of a human being, as opposed to an animal, insect, blowing leaves, etc. in a protected zone. With reference to FIG. 2, biometric sensor 53 is mounted within radome 54 on trailer 12. A radome is an enclosed housing, usually made of a low-loss dielectric material, that serves to protect antennas or sensors mounted on ground-based vehicles, ships, airplanes and like without significantly altering the electrical performance of the enclosed antenna(s) or sensor(s). In one embodiment biometric sensor 53 includes a passive infrared detector. Biometric sensor 53 can detect a point source of heat. The heat generated and thus the heat signature for a human being is different from that of an inanimate object or an animal. In conjunction with the detection of movement of an object by microwave sensor 2, an alarm signal is sent to MCT 42 only after the heat signature detected from the moving object is determined to be consistent with that of a human being. As a supplement to or in substitution of biometric sensor 53, digital video recorder (DVR) 56 includes at least one associated concealed camera mounted outside the trailer 12 that is operable to record video. DVR 56 is activated in conjunction with detection of motion by microwave sensor 2 or in one embodiment, in conjunction with detection of motion along with supplement intruder identification using biometric sensor 53. Using one metric of intruder identification, video samples of intruder movement are analyzed for movement changes within a block of time, e.g. t0 to t0+x. Human movement consistent with suspicious activity may dictate a frequency of movement within the block of time. Once DVR 56 has been activated, the video samples can be transmitted to remote station 44 through MCT 42 for analysis automated analysis of type described above. Alternatively, human monitoring of the digital video is possible. In one embodiment, biometric sensor 53 lies near a container access port such as a door (not shown) near the rear of trailer 12. A similar location can be provided for DVR 56. Although, in either instance these sensors/cameras can be located at any place on or in the trailer so long as the location selection is calculated to identify an entry point for intruders or thieves.

Notwithstanding biometric sensor detection an/or analysis to reduce the false alarm detection rate, the speed of movement calculated using microwave sensor 2 according to Doppler Effect analysis can be used to further reduce the false alarm rate. For instance, the speed of a fast moving bird past trailer 12 may be preclusive of movement by a human being.

It is contemplated that a system as implemented herein will also include tamper detection circuitry wherein an alarm indication is issued to MCT 42 of FIG. 2 should any of the key components of the system, e.g. distributed antenna, DVR, biometric sensor, etc. become inoperative.

With reference to FIG. 2, a very practical embodiment lies in providing DVR 56 together with its one or more associated cameras near an access location of trailer 12, e.g., the cargo door (not shown) of trailer 12. Biometric sensor 53 in the form of a passive infrared detector is also positioned near the cargo door. Should microwave sensor 2 detect movement using distributed antenna 8 and biometric sensor 53 detect a heat signature consistent with that of a human being, DVR 56 starts recording images taken with its associated camera. These images are forwarded by MCT 42 to a remote location for examination either to be done by computer analysis (e.g., analysis of motion within image samples for determination that motion consistent with that of a human being) or manually by a human monitor. This combination of sensors and DVR offers decreased instances of false alarm intrusion events over that offer by any single type of sensor, while providing broader and more accurate security coverage. In any case, the driver of the vehicle or tractor pulling trailer 12 has the ability to shut off the system. The system can also be deactivated remotely through the MCT 42.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A system for providing security for a mobile object in an uncontrolled environment, comprising:
    a wireless transceiver;
    at least one biometric sensor responsive to detection of parameters within a predetermined threshold level;
    a field disturbance sensor operatively connected to the wireless transceiver and the at least one biometric sensor, wherein the field disturbance sensor receives input from the at least one biometric sensor; and
    a distributed leaky coaxial cable that is coupled to the mobile object, adapted to act as an antenna connected to said field disturbance sensor, and substantially disposed around a perimeter of the mobile object, wherein
    the wireless transceiver transmits an alert warning to a remote station in connection with biometric sensor detection of at least one of the parameters within the predetermined threshold level together with detection of an intruder by the field disturbance sensor.

2. A system as recited in claim 1, wherein said object is a trailer.

3. A system as recited in claim 1 wherein said object is a tractor together with a trailer.

4. A system as recited in claim 1 wherein said field disturbance sensor is a microwave sensor.

5. A system as recited in claim 1 wherein said wireless transceiver is responsive to an alarm indication issued from said field disturbance sensor in connection with an intruder entering a protected area.

6. A system as recited in claim 1 wherein said wireless transceiver is operable to receive satellite signals.

7. A system as recited in claim 1 wherein said wireless transceiver is operable to provide communication with a communications system consisting of an analog cellular telephone system, a digital cellular telephone system or a wireless data communications network.

8. A system as recited in claim 1 wherein said biometric sensor is an infrared heat detection sensor.

9. A system as recited in claim 1, further comprising a digital video recorder and camera responsive to detection of an intruder by said field disturbance sensor, said digital video recorder being operable to record camera images in a vicinity of the mobile object.

10. A security device for a vehicle comprising:
a field disturbance sensor operatively connected to a wireless transceiver;
a distributed leaky coaxial cable that is coupled to the vehicle, adapted to act as an antenna connected to said field disturbance sensors and substantially disposed around a perimeter of a substantial portion of said vehicle; and
at least one biometric sensor responsive to detection of parameters within a predetermined threshold level,
wherein the field disturbance sensor receives input from the at least one biometric sensor, and the wireless transceiver transmits an alert warning to a remote station in connection with biometric sensor detection of a parameter within the predetermined threshold level together with detection of an intruder by the field disturbance sensor.

11. A device as recited in claim 10, wherein said vehicle is a trailer.

12. A device as recited in claim 10 wherein said vehicle is a tractor together with a trailer.

13. A device as recited in claim 10 wherein said field disturbance sensor is a microwave sensor.

14. A method for security monitoring of an area around a mobile object, comprising:
detecting motion by sensing field disturbances around the mobile object in connection with receiving signals, at least in part, from a distributed leaky coaxial cable coupled to the mobile object and adapted to act as an antenna circumscribing a perimeter of the mobile object;
analyzing a biometric signal in conjunction with detecting motion; and
recording images of an area under surveillance after detecting motion and analyzing the biometric signal to determine human presence in the area under surveillance based on movement changes in the images within a time period.

15. A method as recited in claim 14 wherein said images are wirelessly forwarded to a remote location.

16. A method as recited in claim 14 wherein the recorded images are analyzed for determination of human intrusion into the area under surveillance.

17. A method as recited in claim 14 wherein said biometric signal is a biometric heat detection signal.

18. An apparatus for security monitoring of an area around a mobile object, comprising:
means for detecting motion, at least in part, by sensing field disturbances around the mobile object in connection with receiving signals from a distributed leaky coaxial cable coupled to the mobile object and adapted to act as an antenna circumscribing a perimeter of the mobile object;
means for analyzing a biometric signal in conjunction with detecting motion; and
means for recording images of an area under surveillance after detecting motion and analyzing the biometric signal to determine human presence in the area under surveillance based on movement changes in the images within a time period.

19. The apparatus of claim 18 further comprising:
means for wirelessly forwarding said images to a remote location.

20. The apparatus of claim 18 further comprising:
means for analyzing the recorded images for determination of human intrusion into the area under surveillance.

21. A device as recited in claim 10, further comprising:
a digital video recorder and camera for recording camera images in a vicinity of the object in response to detection of the intruder by the field disturbance sensor.

22. A device as recited in claim 21, wherein the wireless transceiver transmits the camera images to the remote station.

23. A device as recited in claim 10, wherein the wireless transceiver receives satellite signals.

24. A device as recited in claim 10, wherein the wireless transceiver provides communication with an analog cellular telephone system, a digital cellular telephone system, or a wireless data communications network.

25. A device as recited in claim 10, wherein the at least one biometric sensor includes an infrared heat detection sensor.

* * * * *